(12) United States Patent
Sako et al.

(10) Patent No.: US 6,920,002 B2
(45) Date of Patent: Jul. 19, 2005

(54) REPRODUCING AMPLIFIER AND MAGNETIC RECORDING AND REPRODUCING APPARATUS EMPLOYING THE REPRODUCING AMPLIFIER

(75) Inventors: Michiya Sako, Kagoshima (JP); Kazue Tokuchida, Kagoshima (JP); Keiji Narusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 10/120,114

(22) Filed: Apr. 10, 2002

(65) Prior Publication Data

US 2002/0176191 A1 Nov. 28, 2002

(30) Foreign Application Priority Data

Apr. 10, 2001 (JP) .................................... P2001-110841

(51) Int. Cl.[7] .............................................. G11B 5/02
(52) U.S. Cl. .............................. 360/46; 360/66; 360/67
(58) Field of Search ............................ 360/46, 66, 67, 360/68

(56) References Cited

U.S. PATENT DOCUMENTS 5,345,346 A * 9/1994 Brannon et al. ............... 360/67
5,357,379 A * 10/1994 Gower ........................... 360/46
6,621,649 B1 * 9/2003 Jiang et al. .................... 360/67
6,721,117 B2 * 4/2004 Briskin ........................... 360/66

* cited by examiner

*Primary Examiner*—David Hudspeth
*Assistant Examiner*—Varsha A. Kapadia
(74) *Attorney, Agent, or Firm*—Sonnenschein, Nath & Rosenthal LLP (57) ABSTRACT

In order to solve a problem that it takes a long time to shift from a write mode to a read mode when there is a cross talk of an output signal of a recording head to a reproducing amplifier side, there is provided a reproducing amplifier including an amplifier circuit portion having a differential pair of transistors is provided with a switching circuit comprised of switches connected with resistors, which supply a bias voltage to each base of the differential pair of transistors, respectively in parallel. The switching circuit turns on for a write mode period and for a fixed period after a change from the write mode to a read mode to decrease the input impedance of the reproducing amplifier for the periods.

8 Claims, 7 Drawing Sheets

REPRODUCING AMPLIFIER AND MAGNETIC RECORDING AND REPRODUCING APPARATUS EMPLOYING THE REPRODUCING AMPLIFIER

CROSS REFERENCES TO RELATED APPLICATIONS

The present document is based on Japanese Priority Document JP 2001-110841, filed in the Japanese Patent Office on Apr. 10, 2001, the entire contents of which being incorporated herein by reference.

BACKGROUND OF THE INVENTION

1. Field of the Invention

The present invention relates to a reproducing amplifier and a magnetic recording/reproducing apparatus employing the reproducing amplifier, and more particularly to a reproducing amplifier for amplifying a signal from a reproducing head disposed near to a recording head and a magnetic recording/reproducing apparatus employing the reproducing amplifier.

2. Description of the Related Art

Recently, the main current of the magnetic recording/reproducing apparatus, such as a hard disk drive (HDD) apparatus using a hard disk as a recording medium, for recording and reproducing information to the recording medium has used an inductive head for recording data on the recording medium being a magnetic material by generating a magnetic field produced by an electric current flowing through a coil as a recording head, and has employed a magneto resistive (MR) head (hereinafter referred to as an "MR head") having a characteristic such that the resistance value of the head changes according to changes of a magnetic field as a reproducing head, respectively.

Figure 7:
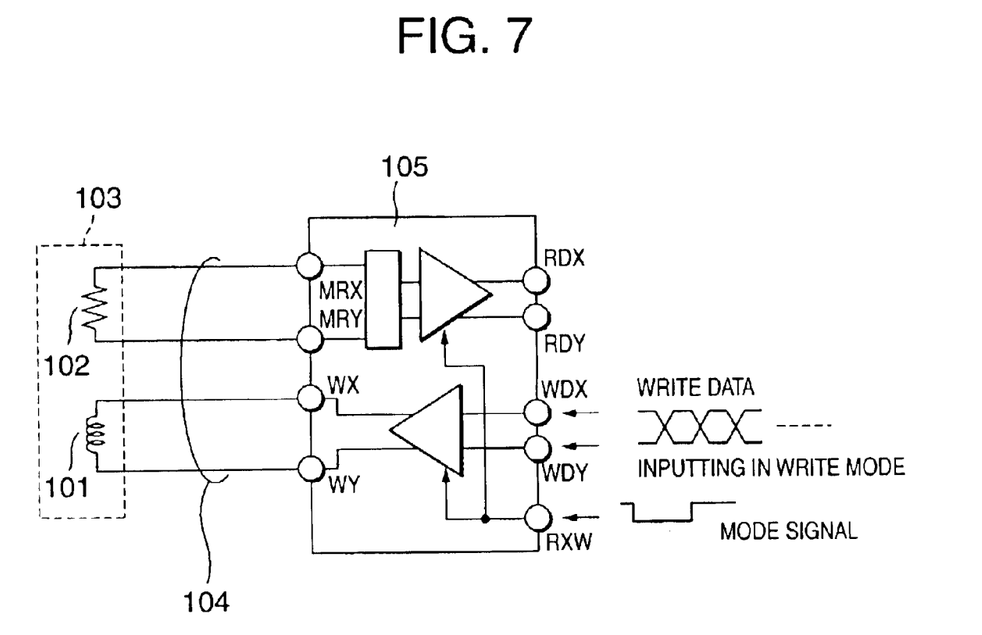
FIG. 7 is a diagram showing the relation of the connection of a head unit and a R/W amplifier in a magnetic recording/reproducing apparatus.

FIG. 7 shows a relation of the connection of a head unit and a read/write (R/W) amplifier in a magnetic recording/reproducing apparatus employing an inductive head and an MR head. In FIG. 7, a head unit 103 including an inductive head 101 and an MR head 102 is connected with an R/W amplifier 105 with flexible printed board wiring 104. Signals are transmitted between the head unit 103 and the R/W amplifier 105 through the flexible printed board wiring 104. In the head unit 103, the inductive head 101 and the MR head 102 are disposed in close vicinity to each other.

At the time of data recording in the magnetic recording and reproducing apparatus constructed as above, the R/W amplifier 105 changes the polarity of an electric current flowing in a coil of the inductive head 101 on the basis of write data input from the outside, and thereby the R/W amplifier 105 makes the inductive head 101 produce a magnetic field to record the data on a magnetic disk with the inductive head 101. At the time of reproduction of data, the R/W amplifier 105 receives a signal read by the MR head 102 through the flexible printed board wiring 104, and then the R/W amplifier 105 amplifies the received signal to output an amplified signal between its terminal RDX and its terminal RDY as a differential signal.

Figure 8:
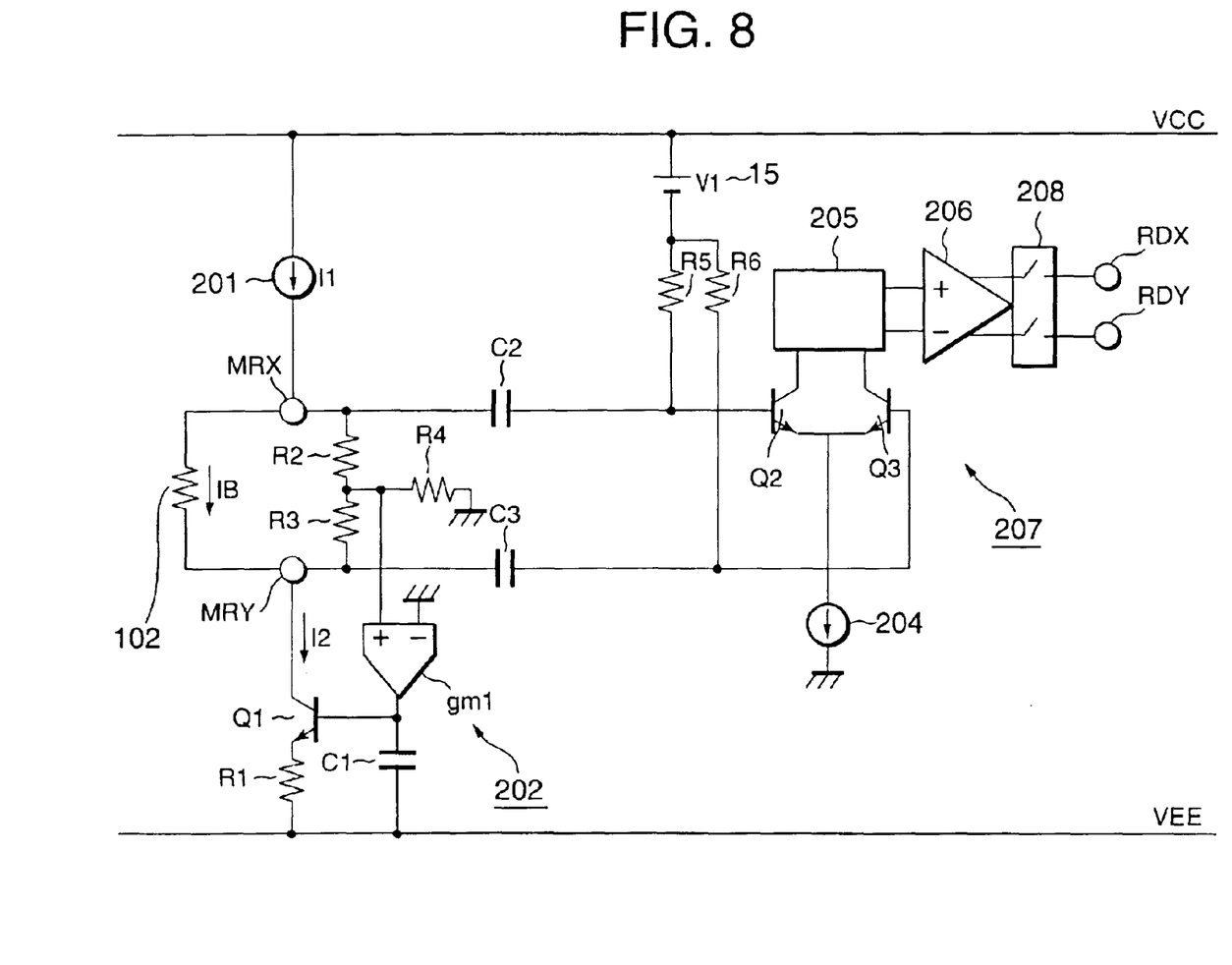
FIG. 8 is a circuit diagram showing a circuit example of a reproducing amplifier according to related art.

FIG. 8 is a circuit diagram showing a circuit example of a reproducing amplifier in the R/W amplifier 105. The reproducing amplifier of the circuit example includes a feedback circuit 202 that supplies a bias current IB flowing in the MR head 102 from a current source 201 connected with a positive power source VCC and controls the electric potential of the middle point of the MR head 102 at the electric potential level of the ground (GND). The reproducing amplifier adopts a current bias voltage sense (CBVS) system in which variation of resistance of the MR head 102 are taken out as voltages.

The MR head 102 is connected between a terminal MRX and a terminal MRY. The feedback circuit 202 is comprised of a transistor Q1, resistors R1–R4, a capacitor C1 and a voltage/current converting circuit gm1. The feedback circuit 202 performs the feedback operation thereof in order that the electric potential at the middle point of the MR head 102 becomes the GND electric potential level. The resistors R2 and R3 are voltage-dividing resistors having resistance values equal to each other.

A signal input from the MR head 102 to the terminal MRX and the terminal MRY is applied to each base of a differential pair of transistors Q2 and Q3 through capacitors C2 and C3, respectively. Each base of the differential pair of transistors Q2 and Q3 is connected with one end of each of resistors R5 and R6, respectively. The other end of each of the resistors R5 and R6 is connected with the negative pole side of a direct-current power supply 15. The positive pole side of the direct-current power supply 15 is connected with the positive power source VCC.

Each of emitters of the differential pair of transistors Q2 and Q3 is commonly connected. A current source 204 is connected between the common connection point and the GND. The differential pair of transistors Q2 and Q3 constitute an amplifier circuit 207 together with a load circuit 205 of the differential pair of transistors Q2 and Q3 and an amplifier 206. Then, a differential signal output from the amplifier circuit 207 is output from the terminal RDX and the terminal RDY through a switching circuit 208 as a signal read by the MR head 102.

In the reproducing amplifier constructed as above, first, a biasing method of the MR head 102 is described. Supposing that an electric current of the current source 201 is designated by a reference character I1 and a collector current of the transistor Q1 is designated by a reference character I2, each electric potential at the terminal MRX and at a terminal + of the voltage/current converting circuit gm1 rises when, for example, the current I1 is larger than the current I2. Because the output current of the voltage/current converting circuit gm1 thereby increases, the base electric potential of the transistor Q1 increases. Consequently, the collector current I2 of the transistor Q1 increases. The operation mentioned above is repeated until the electric potential at the terminal + of the voltage/current converting circuit gm1 becomes the GND electric potential.

If each resistance value of the resistors R2 and R3 is sufficiently larger than the resistance value of the MR head 102, the following relation is satisfied:

$$I1=I2=IB$$

That is, the feedback circuit 202 performs the feedback operation such that the electric current I1 of the current source 201 and the collector current I2 of the transistor Q1 become equal to each other. Because each resistance value of the resistors R2 and R3 is equal to each other, the electric currents flowing through the resistors R2 and R3 are equal to each other. Consequently, the electric potential at the terminal + of the voltage/current converting circuit gm1 is equal to the electric potential at the middle point of the MR head 102. That is, the electric potential at the middle point of the MR head 102 becomes substantially equal to the GND electrical potential level.

Successively, a circuit operation of the reproducing amplifier is described. First, the resistance value of the MR head 102 varies according to variation of a magnetic field. The reproducing amplifier takes out the variation of the resistance value of the MR head 102 as voltages, and amplifies the voltages to output them. That is, supposing that a variation quantity of the resistance value caused by the magnetic field is designated by a reference character ΔRMR and a gain of the amplifier circuit 207 is designated by a reference character Av, a differential signal having the largeness of IB×ΔRMR×Av is output between the terminals RDX and RDY (or output terminals).

The capacitor C2 and the resistor R5 and the capacitor C3 and the resistor R6 are severally constitute a high pass filter for cutting a direct-current component. Ordinarily, the cut-off frequency fo of each of the high pass filters is set at about 500 kHz (=1/(2π×C2×R5), 1/(2π×C3×R6)). When the R/W amplifier 105 is performing recording, the amplifier 206 and the switching circuit 208 are in their off-states.

As shown in FIG. 7, the inductive head 101 and the MR head 102 are in close vicinity to each other, and each wiring to terminals WX and WY is disposed in parallel to each wiring to the terminals MRX and MRY. Consequently, when recording is performed, potential differences to be generated between the terminals WX and WY varies according to a record signal, and the electric potentials of the terminals MRX and MRY (being the input terminals), which are disposed in close vicinity to the terminals WX and WY, of the reproducing amplifier are affected through the capacity coupling of the terminals WX, WY, MRX and MRY owing to the variation of the potential differences between the terminals WX and WY.

Figure 9:
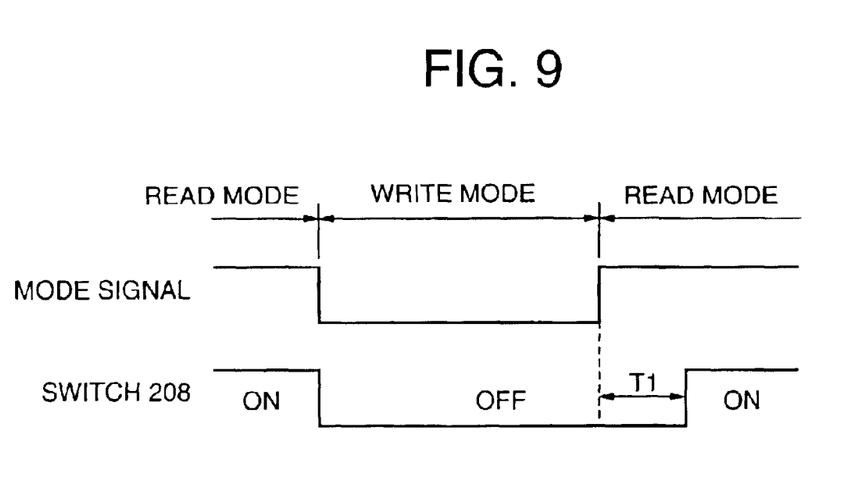
FIG. 9 is a timing chart of switching between a read mode and a write mode of the related art.

FIG. 9 is a timing chart showing timings of switching between a reproducing (read) mode and a recording (write) mode of the R/W amplifier 105. In FIG. 9, a mode signal to be input into a terminal RXW of the R/W amplifier 105 (see FIG. 7) takes an "H" level for a read mode period and an "L" level for a write mode period. Moreover, the switching circuit 208 takes its on-state for a read mode period and its off-state for a write mode period and for a fixed period T1 after a change from a write mode to a read mode.

In a magnetic recording/reproducing apparatus such as a HDD and the like, it is a primary factor for increasing recording capacity of a recording medium to output a reproduced signal as soon as possible after completion of writing. However, in the magnetic recording/reproducing apparatus, a voltage to be generated between the terminals WX and WY at a time of recording generates a differential voltage on bias voltages of the bases of the differential pair of transistors Q2 and Q3 owing to a cross talk between the flexible print board wirings 104 shown in FIG. 7 and a cross talk between the pins of the terminals WX, WY, MRX and MRY. The time constants of the base electric potentials of the differential pair of transistors Q2 and Q3 are substantially determined to be C2×R5(=C3×R6). The amplifier circuit 207 amplifies the difference between base voltages of the differential pair of transistors Q2 and Q3 as if the difference is a signal when the R/W amplifier 105 enters into a read mode with the difference between the base voltages existing.

Moreover, because a path determining the bias current IB of the MR head 102 is in its operating state even if the R/W amplifier 105 is performing recording, the quantities of cross talks to the terminals MRX and MRY of the reproducing amplifier owing to the recording or the like differ from each other. Consequently, when the electric potential at the terminal + of the voltage/current converting circuit gm1 varies, the base electric potential of the transistor Q1 changes from the electric potential at the time of reproducing. Thereby, the collector current I2 of the transistor Q1 changes when the R/W amplifier 105 shifts to its read mode, and the biasing state of the MR head 102 is changed.

Because the conventional magnetic recording/reproducing apparatus has such problems, it is needed for the apparatus to take the measure such that the apparatus sets a delay time of the fixed period T1 to the switching circuit 208 for outputting a signal after waiting the settlement of the base voltages of the differential pair of transistors Q2 and Q3 after its shifting from a write mode to a read mode, or a measure concerning the connection between the head unit 103 and the R/W amplifier 105. Incidentally, the fixed time T1 is needed to be set at the most suitable value according to the system of a magnetic recording and reproducing apparatus because the fixed time T1 depends on the construction of the head unit 103 and the quantity of a cross talk.

SUMMARY OF THE INVENTION

The present invention was made in view of the aforesaid problems to provide a reproducing amplifier capable of shortening the switching time from its write mode to its read mode and a magnetic recording and reproducing apparatus employing the reproducing amplifier.

A reproducing amplifier according to the present invention comprises control means for decreasing its input impedance for a write mode period and for a fixed period after switching from the write mode to a read mode to amplify a signal from a reproducing head. The reproducing amplifier is employed as a reproducing amplifier in a magnetic recording and reproducing apparatus for recording information on a magnetic medium and for reproducing the recorded information according to the present invention.

In the reproducing amplifier constructed as above or in the magnetic recording/reproducing apparatus employing the reproducing amplifier, the input impedance of the reproducing amplifier is decreased for a write mode period and for a fixed period after switching from the write mode to a read mode. Consequently, the time constant of the input circuit of the reproducing amplifier to an input signal is shortened. Thereby, the cross talk of an output signal of the recording head of the magnetic recording/reproducing apparatus is suppressed at the time of recording, and consequently, the switching time from a write mode to a read mode is shortened. And, the reading of a recording medium can be faster in proportion to the shortened switching time.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinafter, the attached drawings are referred while an embodiment of the present invention is described in detail.

Figure 1:
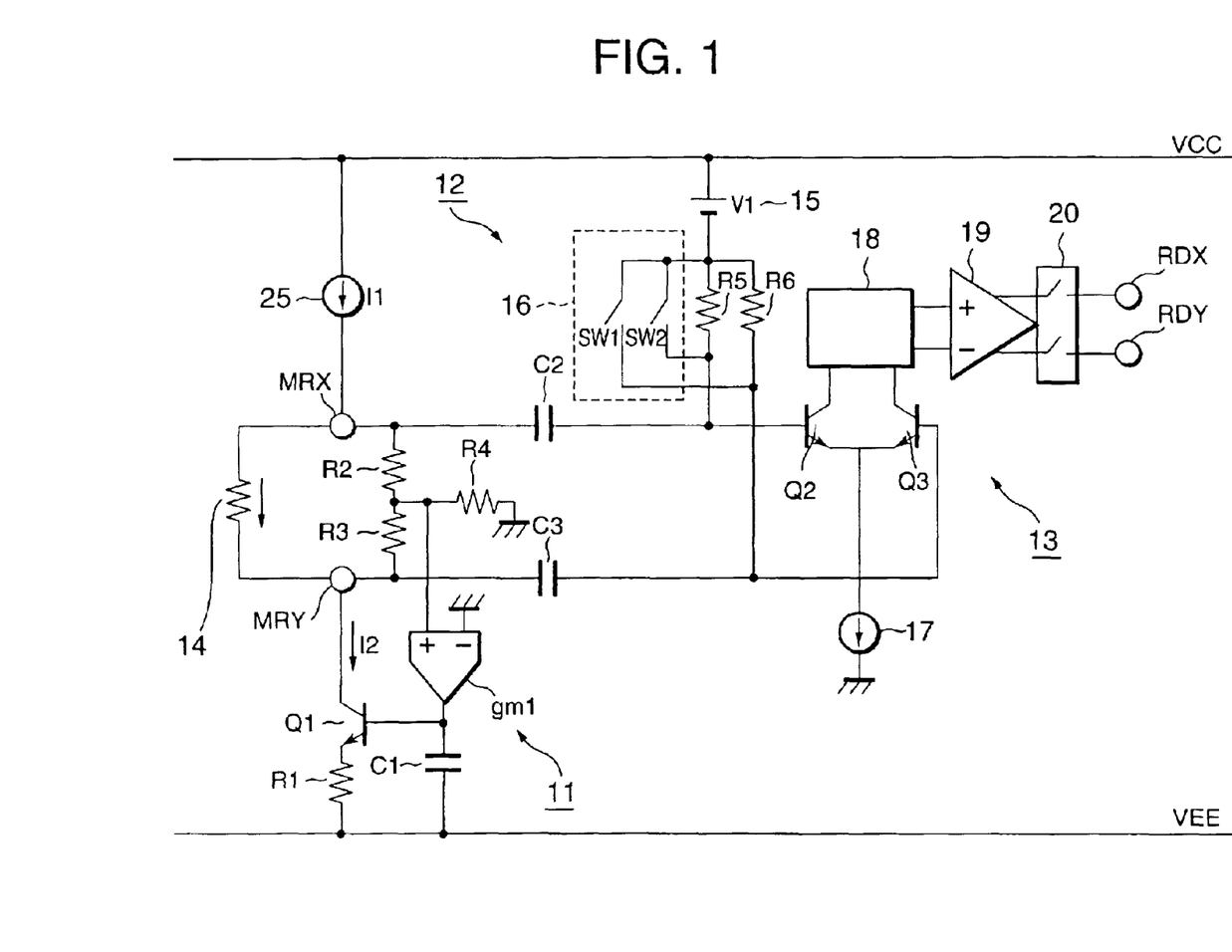
FIG. 1 is a circuit diagram showing a circuit example of a reproducing amplifier according to an embodiment of the present invention.

FIG. 1 is a circuit diagram showing a circuit example of a reproducing amplifier according to an embodiment of the present invention. In FIG. 1, the reproducing amplifier according to the present embodiment is constructed to include terminals MRX and MRY as its input terminals, terminals RDX and RDY as its output terminals, a feedback circuit 11, a filter circuit 12 and an amplifier circuit 13. Between the terminals MRX and MRY, for example, an MR head 14 is connected as a reproducing head. For example, a current bias system in which an electric current I1 is supplied from a current source 25 connected between a power source VCC and the terminal MRX is adopted as a biasing method of the MR head 14.

The feedback circuit 11 is comprised of a transistor Q1, the collector of which is connected with the terminal MRY; a resistor R1 connected between the emitter of the transistor Q1 and a negative power source VEE; a capacitor C1 connected between the base of the transistor Q1 and the negative power source VEE; voltage dividing resistors R2 and R3 connected between the terminals MRX and MRY in series; a resistor R4 connected between the voltage dividing point of the voltage dividing resistors R2 and R3 and the GND; and a voltage/current converting circuit gm1. The terminal + of the voltage/current converting circuit gm1 is connected between the voltage dividing point of the voltage dividing resistors R2 and R3, and the terminal − thereof is grounded, and further the output terminal thereof is connected with the base of the transistor Q1.

The feedback circuit portion 11 operates to perform feedback in order that the electric potential at the middle point of the MR head 14 becomes the GND electric potential level. For that purpose, each resistance value of the voltage dividing resistors R2 and R3 is set to be equal to each other. The voltage/current converting circuit gm1 is the so-called mutual conductance amplifier. The voltage/current converting circuit gm1 detects an electric potential at the voltage dividing point of the voltage dividing resistors R2 and R3 connected in parallel to the MR head 14 as an electric potential at the middle point of the MR head 14. The voltage/current converting circuit gm1 then performs feedback control by feeding the difference between the detected electric potential and the GND electric potential level back to the base of the transistor Q1 as its base voltage in order that the electric potential at the middle point of the MR head 14 becomes the GND electric potential level.

The filter circuit 12 is comprised of two high pass filters for cutting a direct-current component severally. One of the high pass filters is comprised of a capacitor C2, one end of which is connected with the terminal MRX; and a resistor R5, one end of which is connected with the other end of the capacitor C2. The other of the high pass filters is comprised of a capacitor C3, one end of which is connected with the terminal MRY; and a resistor R6, one end of which is connected with the other end of the capacitor C3.

In the filter circuit portion 12, each of the other ends of the resistors R5 and R6 are commonly connected with the negative pole side of a direct-current power supply 15. The positive pole side of the direct-current power supply 15 is connected with the positive power source VCC. The resistors R5 and R6 also have a function of supplying bias electric potentials to each of the bases of a differential pair of transistors Q2 and Q3. The filter circuit portion 12 is further provided with a switching circuit 16 comprised of switches SW1 and SW2 connected with the resistors R6 and R5, respectively, in parallel. The switching circuit 16 turns on for a write mode period of a magnetic recording/reproducing apparatus and for a fixed period after a change of the magnetic recording/reproducing apparatus from the write mode to its read mode as it will be described later.

The amplifier circuit portion 13 is comprised of the differential pair of transistors Q2 and Q3, a current source 17, a load circuit 18, and an amplifier 19. The emitters of the pair of transistors Q2 and Q3 are commonly connected to each other, and each of their bases is connected with each of the other ends of the capacitors C2 and C3, respectively. The current source 17 is connected between the common connecting point of the emitters of the transistors Q2 and Q3 and the GND. The load circuit 18 is connected with each of the collectors of the transistors Q2 and Q3. The amplifier 19 amplifies differential signals derived through the load circuit 18. The differential signals amplified by the amplifier 19 are output from the terminals RDX and RDY through a switching circuit 20 as signals read by the MR head 14.

Figure 2:
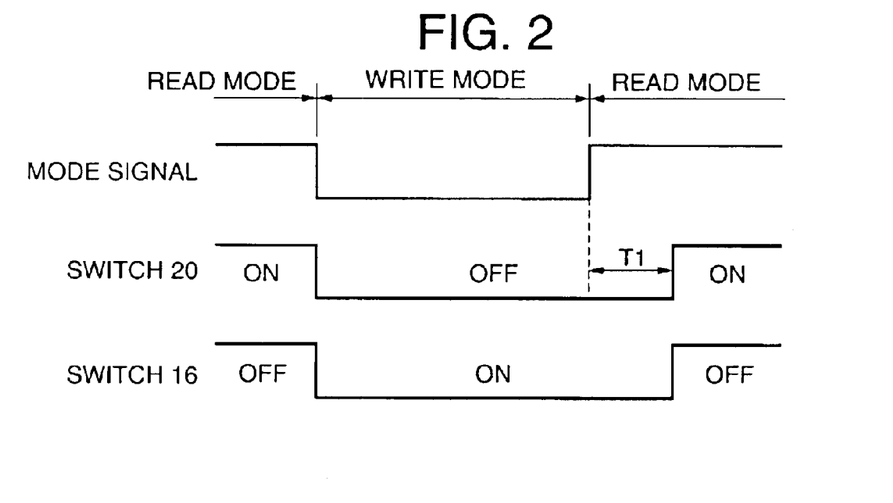
FIG. 2 is a timing chart of switching between a read mode and a write mode in the embodiment.

A timing chart showing the timings of switching between a read mode and a write mode in the embodiment is shown in FIG. 2. As it is clear from FIG. 2, the switching circuit 20 turns on for a read mode period and turns off for a write mode period and for a fixed period T1 after a change from the write mode to a read mode in response to a mode signal (being at an "H" level for a read mode and at an "L" level for a write mode) to be input to the terminal RXW of the R/W amplifier (see FIG. 7). Thereby, after the magnetic recording and reproducing apparatus shifted from a write mode to a read mode, a differential signal is output from the terminals RDX and RDY after the fixed time T1 for the settlement of the base voltages of the differential pair of transistors Q2 and Q3.

On the other hand, the switching circuit 16 turns off for a read mode period and turns on for a write mode period and for the fixed period T1 after the change from the write mode to a read mode conversely to the switching circuit 20. Thereby, the switching circuit 16 shorts both the ends of each of the resistors R5 and R6 for a write mode period and for the fixed period T1 after a change from the write mode to a read mode to decrease the input impedance of the reproducing amplifier. Consequently, the switching circuit 16 has a function of shortening time constants, which is determined by C2×R5 and C3×R6 in the filter circuit 12, by decreasing the input impedance.

Next, the circuit operation of the reproducing amplifier according to the present embodiment constructed as above is described.

In a write mode, the switching circuit 16 is in its on-state, and then the resistors R5 and R6 are shorted by the switches SW1 and SW2. Thereby, in the write mode, even if cross talks of record signals are input into the terminals MRX and MRY, the base electric potentials of the differential pair of transistors Q2 and Q3 remain at the voltage of VCC−V1, and no voltage changes owing to influences of the cross talks caused by output signals of a recording head to the reproducing amplifier side are produced.

The fact that the base electric potentials of the differential pair of transistors Q2 and Q3 do not change in a write mode as described above means that the fixed time T1 can be set shorter because the amplifier circuit 13 amplifies only actual signal components even if the magnetic recording/reproducing apparatus shifted from the write mode to a read mode. And, the capability of setting the fixed time T1 shorter makes it possible to shorten the period of time from the end of a write mode to the output of a reproducing signal (or a differential signal) by the reproducing apparatus.

Figure 3:
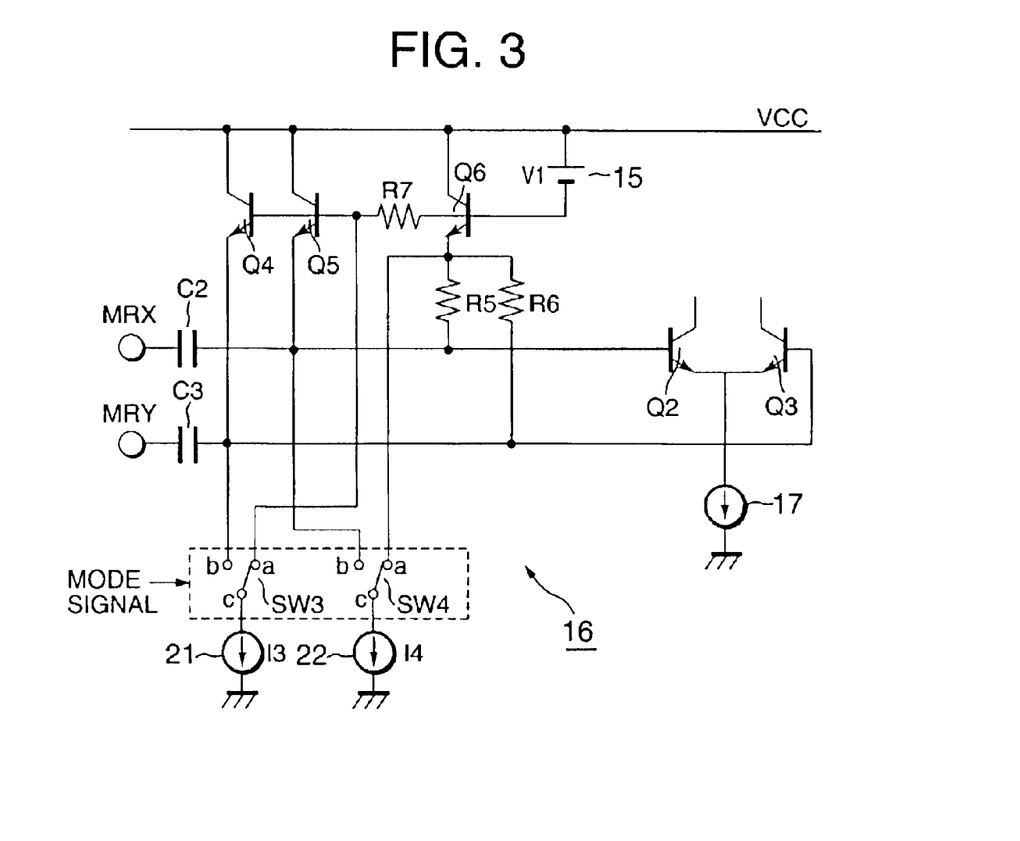
FIG. 3 is a circuit diagram showing a concrete circuit example realizing a switching circuit of the reproducing amplifier together with peripheral circuits of the switching circuit.

FIG. 3 is a circuit diagram showing a concrete circuit example realizing the switching circuit 16 together with peripheral circuits thereof. In FIG. 3, the same reference marks are given to the same components disclosed in FIG. 1.

In FIG. 3, a transistor Q4 is connected between the power supply VCC and the other end of the capacitor C3, and a transistor Q5 is connected between the power supply VCC and the other end of the capacitor C2. Each base of the transistors Q4 and Q5 are commonly connected to each other. Moreover, a transistor Q6 is connected between the power source VCC and each of the other ends of the resistors R5 and R6. The base of the transistor Q6 is connected with the negative pole side of the direct-current power supply 15. A resistor R7 is connected between each of the bases of the transistors Q4 and Q5 and the base of the transistor Q6.

Switches SW3 and SW4 are switches performing their switching operations on the basis of the aforesaid mode signal. Current sources 21 and 22 are connected between each of the movable terminals c of the switches SW3 and SW4 and the GND, respectively. Supposing that each of the electric currents flowing each of the current sources 21 and 22 are respectively designated by reference characters I3 and I4, the currents I3 and I4 satisfy the relation of I3=I4. A fixed terminal a on one side of the switch SW3 is connected with each of the bases of the transistors Q4 and Q5, and a fixed terminal b on the other side of the switch SW3 is connected with the other end of the capacitor C3. A fixed terminal a on one side of the switch SW4 is connected with each of the other ends of the resistors R5 and R6, and a fixed terminal b on the other side of the switch SW4 is connected with the other end of the capacitor C2.

In the switching circuit 16 constructed as above, in a read mode, the switches SW3 and SW4 are connected with the fixed terminal a side. At this time, the base electric potentials of the transistors Q4 and Q5 are the electric potential that drops by R7×I3 (set at, e.g. about 300 mV) from the direct-current voltage V1. Consequently, the transistors Q4 and Q5 turn off, and the electric current I4 of the current source 22 flows through the transistor Q6.

In such a state, supposing that the voltage between the base and the emitter of the transistor Q6 is designated by a reference character Vbe, the base electric potentials of the transistors Q2 and Q3 are about the voltage of VCC−V1−Vbe. Then, if the reproducing amplifier is seen from the MRX terminal, the reproducing amplifier is seen to be a high pass filter comprised of the capacitor C2 and the resistor R5. The time constant of the high pass filer is C2×R5. Incidentally, the cut-off frequency fo of a signal is determined by a formula: fo=1/(2π×C2×R5).

In a write mode, the switches SW3 and SW4 are switched to the fixed terminal b side. Then, the transistors Q4 and Q5 turn on. In this time, supposing that each of the voltages between the bases and the emitters of the transistors Q4 and Q5 is designated by a reference character Vbe, the base electric potentials of the transistors Q2 and Q3 are about the voltage of VCC−V1−Vbe. That voltage is the same as one at an ordinary read mode. However, if the reproducing amplifier is seen from the MRX terminal, the reproducing amplifier is seen to be a high pass filter comprised of the capacitor C2 and an AC impedance re of the transistor Q4. The time constant of the high pass filer is C2×re.

The AC impedance re of the transistor Q4 is expressed by a formula:

$$re=V_T/I3$$

where $V_T$ indicates a thermal voltage and is expressed by a formula:

$$V_T=kT/q$$

where k indicates Boltzmann's constant, and T indicates an absolute temperature, and further q indicates an elementary electric charge.

If the resistances of the resistors R5 and R6 are set at about 10 kΩ, the AC impedance re can be set about 100 U to the resistances of the resistors R5 and R6 at some values of the electric current I3 of the current source 21. Consequently, the time constant of the high pass filter comprised of the capacitor C2 and the AC impedance re is shortened by two columns in comparison with the time constant of the high pass filter comprised of the capacitor C2 and the resistor R5. And then, the convergence time of the base voltages of the transistors Q2 and Q3 can be shortened.

Figure 4A:
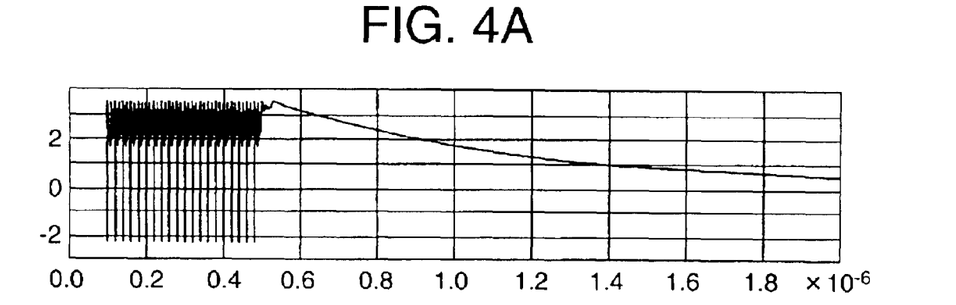
FIG. 4A and FIG. 4B are graphs showing simulation results when the switching circuit operates.
Figure 4B:
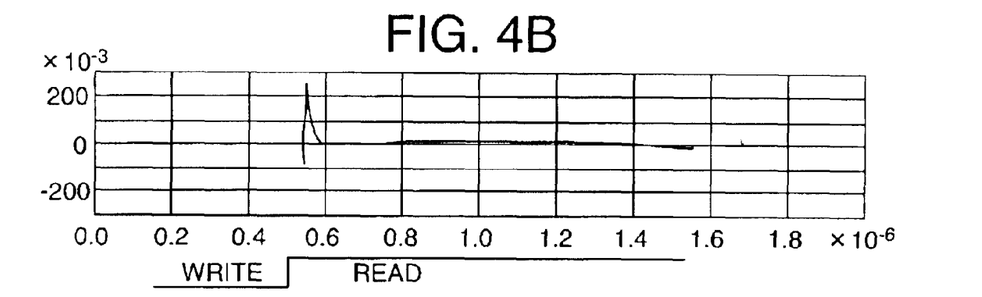
Figure 5A:
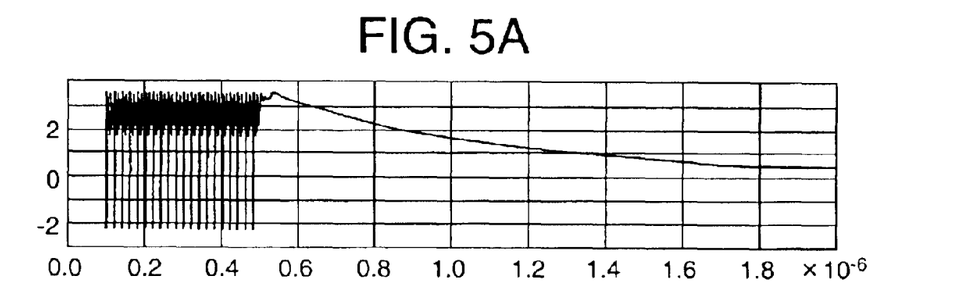
FIG. 5A and FIG. 5B are graphs showing simulation results when the switching circuit does not operate.
Figure 5B:
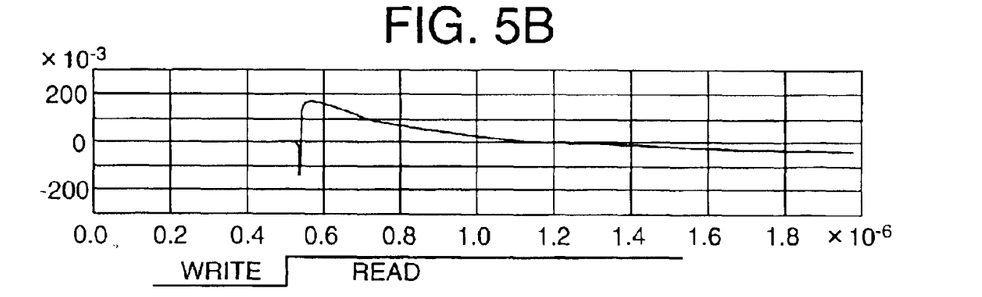

Data of simulations are shown in FIGS. 4A, 4B, 5A and 5B. FIG. 4A and FIG. 4B show simulation results when the switching circuit 16 operates, and FIG. 5A and FIG. 5B show simulation results when the switching circuit 16 does not operate. Incidentally, in the simulation, the fixed time T1 in the timing chart shown in FIG. 2 is set to be zero, and the waveforms of the simulation results are output under the condition.

In FIGS. 4A–5B, FIG. 4A and FIG. 5A are output waveforms of a recording head. The first half parts of the waveforms indicate the behavior of the waveforms of the recording head in a write mode, and the waveforms after that indicate the behavior of the waveforms of the recording head after a shift to a read mode. FIG. 4B and FIG. 5B are output waveforms of the reproducing amplifier. As a comparison of the output waveforms of the reproducing amplifier makes it clear, in a case where the switching circuit 16 does not operate as shown in FIG. 5B, namely in a case of the related art in which the switching circuit 16 is not provided, the converge of the output waveform to zero takes a time owing to the influence of the cross talk of a record signal to the reproducing amplifier side at the time of recording. On the contrary, in a case where the switching circuit 16 is operated as shown in FIG. 4B, the output waveform of the reproducing amplifier instantly converges to zero.

Incidentally, although the present embodiment adopts the current bias system in which the electric current I1 is supplied from the current source 25 as the biasing method to the MR head 14, any biasing method to the MR head 14 may be adopted as long as an actual circuit system for amplifying a signal adopts the voltage sense system in which the direct-current components of output signals of the MR head 14 are cut off by the capacitors C2 and C3.

The reproducing amplifier according to the present embodiment described above is used as a R/W amplifier in a magnetic recording and reproducing apparatus. The construction of a high density magnetic recording and reproducing apparatus adopting, for example, a partial response maximum likelihood (PRML) system is shown in FIG. 6 as the magnetic recording/reproducing apparatus.

Figure 6:
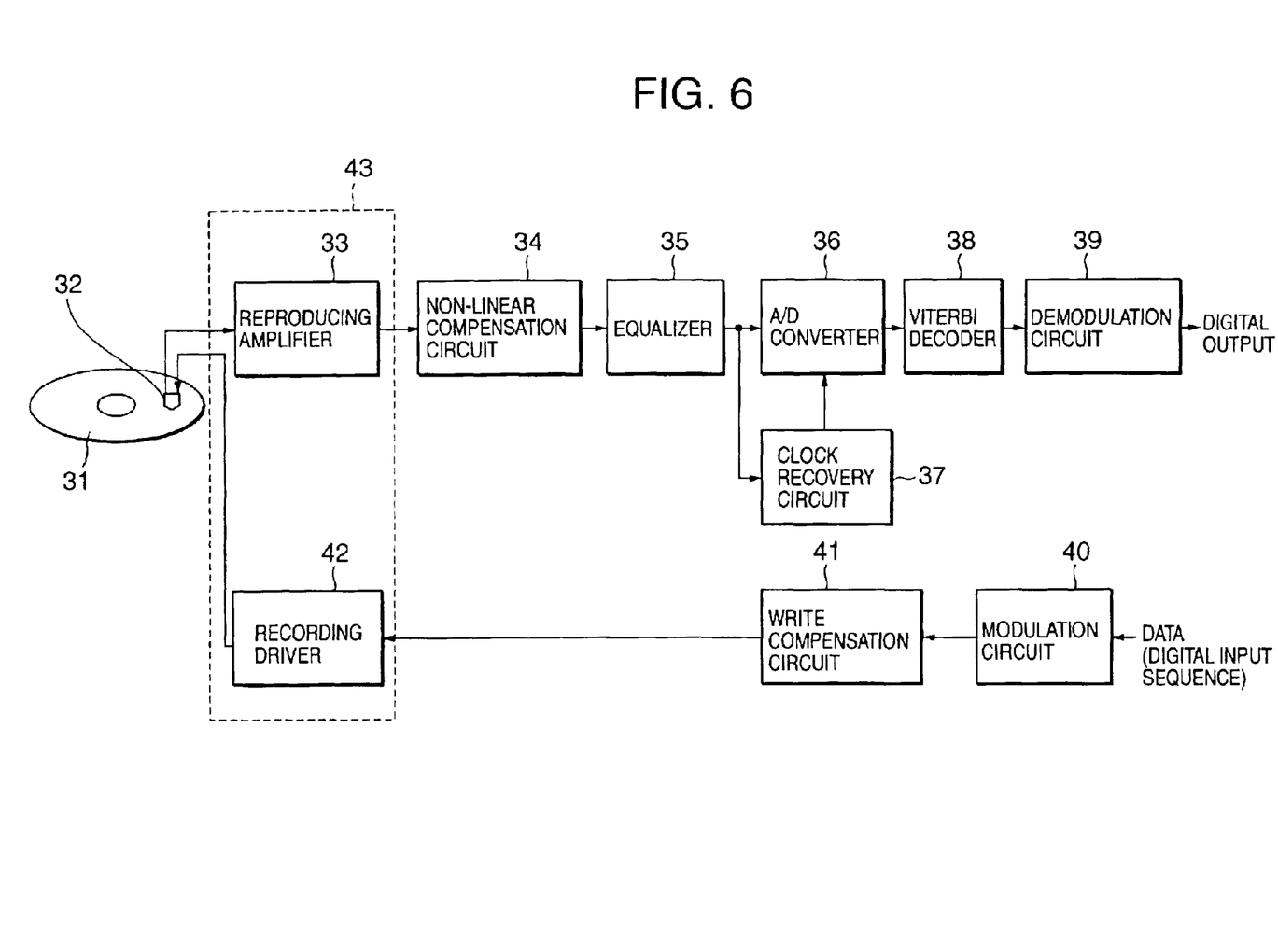
FIG. 6 is a block diagram showing an example of the construction of a high density magnetic recording/reproducing apparatus adopting a partial response maximum likelihood (PRML) system.

In FIG. 6, a head unit 32 reads recorded information on a recording medium 31 in a shape of a disc. A reproduced signal to be output from the head unit 32 is supplied to a non-linear compensation circuit 34 through a reproducing amplifier 33. The compensation of the frequency characteristic of the reproduced signal, the non-linear compensation of which has been done by non-linear compensation circuit 34, is performed by an equalizer 35. After that, the compensated reproduced signal is supplied to an A/D converter 36 and a clock recovery circuit 37. The clock recovery circuit 37 generates clocks synchronized with the reproduced signal on the reproduced signal after being processed by the equalizer 35.

The clocks generated by the clock recovery circuit 37 are supplied to the A/D converter 36 as its sampling clocks. The A/D converter 36 samples the reproduced signal synchronously to the sampling clocks supplied from the clock recovery circuit 37, and thereby the A/D converter 36 converts the reproduced signal to digital data. After the A/D conversion of the reproduced signal has been performed by the A/D converter 36, the Viterbi decoding of the converted digital data is performed by a Viterbi decoder 38. Moreover, the demodulation of the decoded data is performed by a demodulation circuit 39.

On the other hand, in the recording system (or a write system), data (or a digital input sequence) are modulated by a modulation circuit 40. Then, the write compensation of the modulated data is performed by a write compensation circuit 41. After that, the compensated data are supplied to the head unit 32 through a recording driver 42. And then, the head unit 32 performs the writing (or recording) of information to the recording medium 31.

In the high density magnetic recording and reproducing apparatus constructed as above, as described in regard to FIG. 7, the head unit 32 is constructed to dispose the inductive head 101 as a recording head and the MR head 102 as a reproducing head near to each other. Moreover, the reproducing amplifier 33 and the recording driver 42 constitutes an R/W amplifier 43. Then, the reproducing amplifier of the embodiment described above is used as the reproducing amplifier 33 in the R/W amplifier 43.

An adoption of the reproducing amplifier according to the embodiment described above as the reproducing amplifier 33 in the R/W amplifier 43 in the high density magnetic recording and reproducing apparatus makes it possible for the reproducing amplifier 33 to output a reproduced signal rapidly after the completion of a write mode. In other words, because the switching time from a write mode to a read mode can be shortened, the reading of a recording medium can be faster in proportion to the shortened switching time.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A reproducing amplifier for amplifying a signal from a reproducing head, said amplifier comprising:

control means for decreasing an input impedance of the reproducing amplifier for a write mode period and for a fixed period after switching from the write mode to a read mode;

a differential pair of transistors for receiving the signal from the reproducing head as a differential input; and a pair of resistors for supplying a bias electric potential to each control electrode of said differential pair of transistors, wherein said control means is a switching circuit for shorting said pair of resistors for the write mode period and for the fixed period after the switching from the write mode to the read mode.

2. The reproducing amplifier according to claim 1, wherein said reproducing head is a magneto resistive head, a resistance value of which changes according to a direction of magnetization.

3. The reproducing amplifier according to claim 1, wherein said reproducing head is disposed to be in close vicinity to a recording head being an inductive head.

4. The reproducing amplifier according to claim 1, wherein said amplifier prohibits outputting an output thereof for the fixed period.

5. A magnetic recording/reproducing apparatus for recording information on a medium being a magnetic material and reproducing the recorded information, said apparatus comprising:

a reproducing amplifier for amplifying a signal from a reproducing head, said amplifier including control means for decreasing an input impedance of the reproducing amplifier for a write mode period and a fixed period after switching from the write mode to a read mode;

a differential pair of transistors for receiving the signal from the reproducing head as a differential input; and a pair of resistors for supplying a bias electric potential to each control electrode of said differential pair of transistors, wherein said control means is a switching circuit for shorting said pair of resistors for the write mode period and for the fixed period after the switching from the write mode to the read mode.

6. The magnetic recording and reproducing apparatus according to claim 5, wherein said reproducing head is a magneto resistive head, a resistance value of which changes according to a direction of magnetization.

7. The magnetic recording and reproducing apparatus according to claim 5, said apparatus further comprising a recording head being an inductive head, wherein said reproducing head is disposed to be in close vicinity to the recording head.

8. The recording and reproducing apparatus according to claim 5, wherein said amplifier prohibits outputting an output thereof for the fixed period.

* * * * *